June 30, 1931.  E. F. GEIGER  1,812,628

AUTOMATIC BATTERY CHARGING SYSTEM

Filed Sept. 27, 1928

Inventor
Edward F. Geiger
By his Attorney
W. M. Wilson

Patented June 30, 1931

1,812,528

UNITED STATES PATENT OFFICE

EDWARD F. GEIGER, OF BINGHAMTON, NEW YORK, ASSIGNOR TO INTERNATIONAL TIME RECORDING COMPANY OF NEW YORK, OF ENDICOTT, NEW YORK, A CORPORATION OF NEW YORK

AUTOMATIC BATTERY CHARGING SYSTEM

Application filed September 27, 1928. Serial No. 308,674.

The present invention relates to an automatic charging device for storage batteries.

It is the main object of the invention to provide a charging device, charging the battery periodically and automatically.

Another object of the invention is to provide time controlled means supplied by the battery whereby said time controlled means control the charging circuit.

A further important object of the invention is to provide an automatic charging device having a time controlled period for charging said battery and means for charging said battery independently of said time controlled period from a reduced voltage up to a certain predetermined voltage.

A further object of the invention is to charge the battery additionally to the predetermined voltage obtained as aforesaid with a variably adjustable but constant charge during each charging period.

Other objects and advantages will be hereinafter set forth in the accompanying specification and claims and shown in the drawings which show by way of illustration what I now consider to be the preferred embodiments of the invention.

Figure 1:
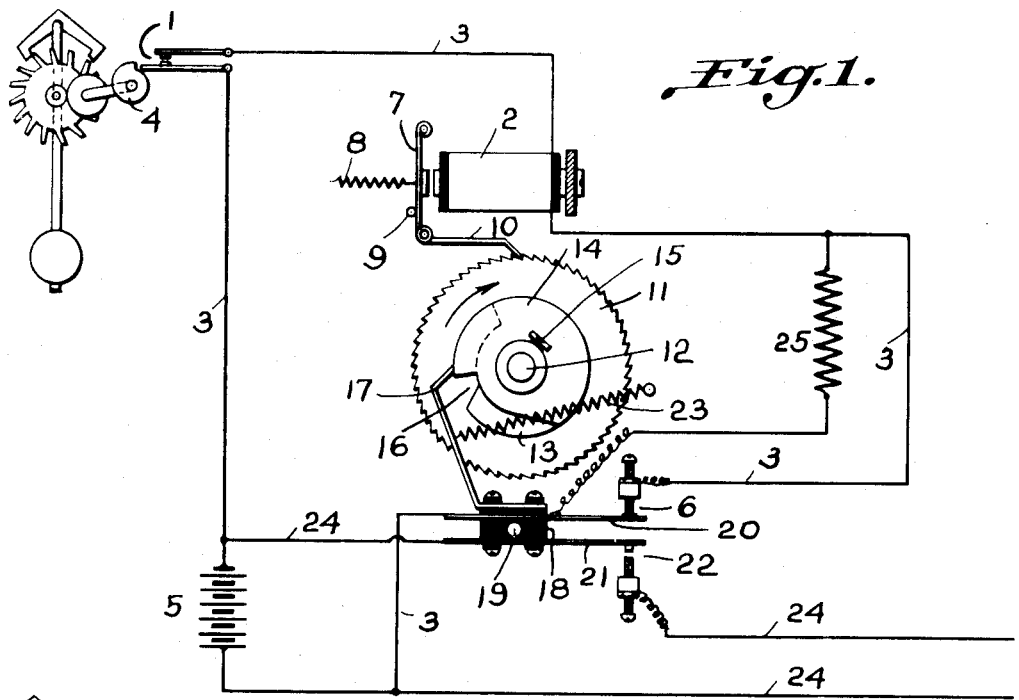
Fig. 1 illustrates schematically the new automatic charging device in connection with the respective circuits.

Referring to Fig. 1 numeral 2 designates a magnet arranged within a circuit 3. This circuit comprises contacts 1 closed by cams 4 which may be turned, e. g. by a time recording apparatus such as shown in Bryce's Patent #1,687,491, contact 17 and cam 18, Fig. 1, to periodically supply current from the battery 5 to magnet 2 over contacts 6. Armature 7 of magnet 2 is drawn by a spring 8 against a stop 9 and is normally held in this position. A ratchet pawl 10 is connected with armature 7 to shift a ratchet wheel 11 the space of one tooth each time magnet 2 is energized. Wheel 11 is mounted upon shaft 12 carrying also a cam wheel 13. A second cam wheel 14 may be adjusted upon the shaft by screw 15 thus forming an arbitrarily adjustable notch 16 between the cam wheels.

Sliding upon both cam wheels is a pawl 17 fixed upon a support 18 pivoted upon pin 19. Insulating support 18 carries contact plates 20 and 21 connected at their left ends with opposite poles of battery 5 and cooperating at their right ends with contacts 6 and 22. Spring 23 normally tends to turn support 18 clockwise but as long as pawl 17 is sliding upon the outer surface of the cam wheels support 18 will remain in the position shown in Fig. 1 where contacts 6 are closed. If ratchet wheel 11 is turned sufficiently to bring notch 16 opposite pawl 17 this pawl will pass into the notch and consequently support block 18 will turn clockwise under the influence of spring 23 thus closing contacts 22 and connecting the battery with charging circuit 24. Contacts 6 are shunted as may be seen from Fig. 1 by a resistance, so that even when the battery is switched to the charging circuit a current impulse through magnet 2 will be effected when cam contacts 1 close. In consequence of resistance 25 the current will be very low so that the energized magnet 2 will not be able to overcome the tension of spring 8 until the battery has been charged sufficiently to effect attraction of armature 7. Then ratchet wheel 11 will be actuated again but the charging circuit will be maintained until pawl 17 leaves notch 16 to slide upon cam wheel 13. It will be noticed that the support 18 is turned counterclockwise to open contacts 22 and to close again contacts 6.

Figure 2:
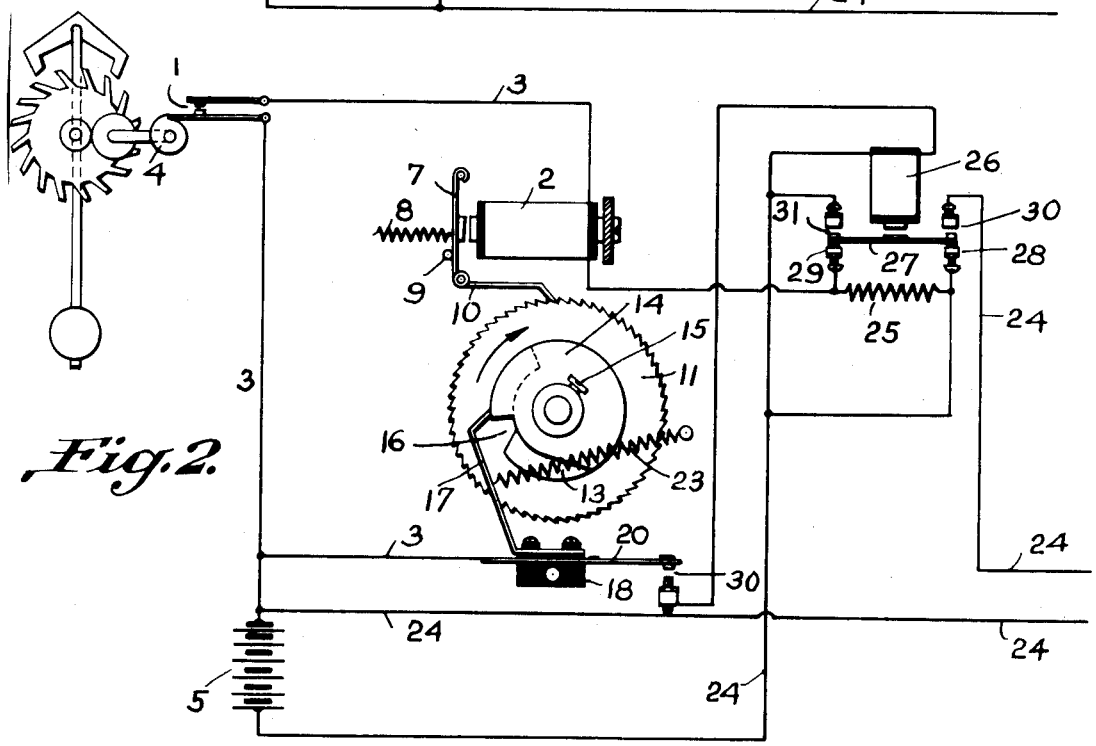
Fig. 2 shows a similar embodiment of the invention under control of an auxiliary relay.

Fig. 2 shows a similar embodiment of the invention as Fig. 1 but using a relay for switching the charging circuit and control circuit for magnet 2. The same reference numerals are used for identical parts in both figures and the general operation in Fig. 2 agrees with that in Fig. 1. Referring to Fig. 2 the circuit of magnet 2 is controlled as in Fig. 1 by cam contacts 1. If these contacts are closed a current impulse will be effected from battery 5 over line 3, contacts 1, line 3, magnet 2, contacts 29, armature 27, contacts 28, and line 24 back to the battery.

It will be seen that now resistance 25 is short circuited and that relay 26 may not be energized as long as pawl 17 slides upon the peripheries of wheels 13 and 14. When ratchet wheel 11 has been shifted step by step sufficiently to allow pawl 17 to pass into notch 16, support 18 will rock clockwise and contacts 30 will be closed. In consequence thereof a circuit will be established from battery 5, over line 3, plate 20, contacts 30, relay 26, line 24 back to battery 5. Relay 26 will now be energized to close contacts 30 and 31 thus connecting battery 5 with charging circuit 24 as may be seen from Fig. 2.

In a similar way as in Fig. 1 magnet 2 will be supplied over resistance 25 and when the voltage of battery 5 is high enough, magnet 2 will again attract its armature 7 against the tension of spring 8 and will shift ratchet wheel 11. When pawl 17 enters notch 16, charging of the battery will take place until pawl 17 is rocked counterclockwise by cam wheel 13 whereby contacts 30 will be interrupted thus deenergizing relay 26 and interrupting the charging circuit by opening of contacts 30 and 31. Then magnet 2 will be supplied again in the normal way over contacts 28 and 29 shortcircuiting resistance 25.

It may be recognized that in the above described way the battery will be charged periodically up to a certain charge in two phases. First it will be charged up to a certain voltage until magnet 2 supplied over resistance 25 will attract its armature and when this takes place the battery will be charged further during a certain time which is constant for each charging period and depends from the adjustment of width of notch 16. The new device therefore secures periodically charging of the battery to a certain charge independent of the previous charge or voltage, and independent of the charging period whereby the charging periods as well as the additional charge may be adjusted at will.

While there has been shown and described and pointed out the fundamental novel features of the invention as applied to two modifications it will be understood that various omissions and substitutions and changes in the form and details of the device illustrated and in its operation may be made by those skilled in the art without departing from the spirit of the invention.

It is the intention therefore to be limited only by the scope of the following claims:

1. In combination, a storage battery, a charging circuit therefor, time controlled means actuated by said battery and means controlled by said time controlled means to connect the battery either with the charging circuit or with said time controlled means.

2. In combination, a storage battery, a charging circuit therefor, a time controlled circuit parallel to said charging circuit, said time controlled circuit including a magnet, adjustable controlling means to connect said battery selectively with the charging circuit or with said time controlled circuit whereby the switching periods may be determined by said adjustable means.

3. In combination, a storage battery, a charging circuit therefor, a time controlled circuit parallel to said charging circuit, said time controlled circuit including adjustable cam contact means and a magnet controlled thereby, a switch to connect the battery selectively with the charging circuit or with said time controlled circuit, said switch being controlled by the aforesaid magnet.

4. In combination, a storage battery, a charging circuit therefor, a time controlled circuit supplied by said battery, means controlled by said time controlled circuit to selectively connect the battery either with the charging circuit or said time controlled circuit, a resistance, and means to include said resistance within the time controlled circuit when the battery is switched to the charging circuit in order to govern the operation of the time controlled circuit.

5. In combination, a storage battery, a charging circuit therefor, a time controlled circuit supplied by said battery and including a magnet, contacts and a resistance bridging said contacts, a ratchet wheel cooperating with a pair of adjustable cam wheels, said ratchet wheel being actuated by the magnet of said time controlled circuit, rockable switching members controlled by said cam wheels to close the charging circuit when the time controlled circuit is opened by means of the aforesaid contacts vice versa.

6. In combination, a storage battery, a charging circuit therefor, means for periodically connecting said battery to said charging circuit for predetermined charging intervals and means controlled by the battery for modifying the operation of the connecting means to increase the charging intervals automatically when the battery voltage is too low to be compensated during the normal charging interval.

7. In combination, a storage battery, a charging circuit therefor, means for periodically connecting said battery to said charging circuit, said means including mechanism for maintaining said connection for a predetermined time interval and means controlled by the battery on an abnormally low voltage for delaying the operation of said mechanism until the battery voltage reaches its normal low voltage.

8. In combination, a storage battery, a charging circuit therefor, means for periodically connecting said battery to said charging circuit and means controlled by said battery in accordance with its voltage during the charging period for determining the length of the interval during which the battery is connected to the charging circuit.

9. In combination, a storage battery, a charging circuit therefor, means for periodically connecting said battery to said charging circuit, said means including cyclically operable mechanism for governing the length of time during which the charging connection is maintained and means controlled by the battery for determining the time at which the operation of the cyclically operable mechanism is initiated after a charging connection.

10. In combination, a battery, a charging circuit therefor, cyclically moving means for connecting the battery to the circuit for regular predetermined charging intervals, and means controlled by the battery voltage for varying the regular predetermined charging interval.

In testimony whereof I hereto affix my signature.

EDWARD F. GEIGER.